(12) United States Patent
Repucci (10) Patent No.: US 6,273,436 B1
(45) Date of Patent: Aug. 14, 2001

(54) SKATE BRAKE SYSTEM AND METHODS FOR MULTIPLE BRAKING EFFECTS

(76) Inventor: Richard M. Repucci, 44 Summer St., Medford, MA (US) 02155

( * ) Notice: Subject to any disclaimer, the term of this patent is extended or adjusted under 35 U.S.C. 154(b) by 0 days.

(21) Appl. No.: 09/307,418

(22) Filed: May 9, 1999

Related U.S. Application Data (60) Provisional application No. 60/085,044, filed on May 11, 1998.

(51) Int. Cl.[7] ............................. A63C 17/14; B60T 1/14
(52) U.S. Cl. ............................. 280/11.217; 280/11.208; 188/5
(58) Field of Search ........................... 280/11.217, 11.216, 280/11.215, 11.214, 11.208, 11.206, 11.204; 188/5, 4 R (56) References Cited

U.S. PATENT DOCUMENTS

| | | | |
|---|---|---|---|
| 5,183,275 | * | 2/1993 | Hoskin .......................... 280/11.215 |
| 5,299,815 | * | 4/1994 | Brosnan et al. ................. 280/11.215 |
| 5,582,418 | * | 12/1996 | Closser .......................... 280/11.215 |
| 5,664,794 | * | 9/1997 | Mitchell et al. ................. 280/11.215 |
| 5,755,449 | * | 5/1998 | Pozzobon ....................... 280/11.215 |
| 5,951,027 | * | 9/1999 | Oyen et al. ..................... 280/11.215 |
| 5,992,862 | * | 11/1999 | Mitchell ......................... 280/11.215 |

* cited by examiner

*Primary Examiner*—Lanna Mai
*Assistant Examiner*—Jeffrey J Restifo (57) ABSTRACT

A skate brake and methods for multiple braking effects for in-line skates, roller skates and like devices is disclosed. The skate brake comprises of a wheel rotatively mounted to an axle being occupied between runners and located within slots of a chassis with said axle being held against said slots by springs and said axle is a linkage to which is affixed a friction surface used for contacting the skating surface with a segment of said linkage bearing upon a ramp which in turn changes the direction of motion of said axle as it translates through said slots against said springs under the effect of a skater's weight and momentum, forcing said friction surface into contact with said skating surface.

3 Claims, 7 Drawing Sheets

SKATE BRAKE SYSTEM AND METHODS FOR MULTIPLE BRAKING EFFECTS

This application claims benefit of provisional application serial No. 60/085,044 filed May 11, 1998.

BACKGROUND OF THE INVENTION

This invention relates to a skate brake system and methods for multiple braking effects for in-line skates, roller skates and like devices.

In-line skating is one of the fastest growing sports in the world today because it offers individuals an opportunity to attain a great exercise benefit, the advantage of being a highly enjoyable endeavor and the occasion to travel from place to place in the great outdoors. Also, the great likeness of in-line skating to ice skating has seen the rise of cross-training in the off season for skaters as well as hockey enthusiasts. Concurrently, there has been a tremendous rise in the rate of serious injuries from in-line skating especially among young children chiefly due to lack of an effective, low cost and easy to use braking mechanism.

Some of the commonly used braking devices employ little more than a fixed rubber stopper cantilevered from the back of a skate which requires the skater to awkwardly shift weight to one skate and then drag the stopper of the other skate along the skating surface to gain some braking effect. Stopping distances are often great with this device and planning of when and where to stop is necessary, especially when skating at advanced speeds. This design is of little value to skaters when a Sudden stop is required or when attempting to stop going down hill, Also, a prime disadvantage is that the stopper can interfere with skating during cornering or when crossing over as it is normally held close to the skating surface on most skates. An improvement over the stopper is a design which uses a heel-cuff activated stopper. This device requires the skater to slide the braking foot forward 2–3 feet which in turn pivots the cuff rearward thus pushing the stopper down and into contact with the skating surface. Better balance is thus maintained during skating and an improved braking effect is realized. However, the disadvantages of this design are significant as the skater must extend the braking skate along the skating surface; far forward of the other skate to gain an increase in braking effect. Also, the ability to maintain the brake when stopped requires the skater to remain in an outstretched position with skates 2–3 feet apart. Additionally, the device is virtually unusable when going downhill and the stopper, although adjustable can interfere when cornering. An additional disadvantage is the higher cost of purchasing skates which incorporate this device.

More recently, there has been an increasing number of devices which employ use of a series of linkages which are activated either from a pivotally motivated heel cuff or a cable pull. These devices use the force of a levered hand grip or in some cases an electrically actuated solenoid to move a brake pad into contact with the skating surface or with one of the skate wheels. Such devices are somewhat complicated, involve hand/foot coordination and can be expensive to manufacture. None address the issue of inadvertent stopper contact with the skating surface during cornering or can provide effective braking when going downhill. Additionally, keeping the braking foot parallel to the skating surface during braking is not always good practice as has been promoted by producers of these devices. In actuality, to account for the force component along the skating surface due to the skater's weight and momentum during braking it is more desirable to have a support held at an angle to the skating surface as what occurs when the skate is tilted back during braking. Although a braking action is afforded by use of these devices significant disadvantages are clearly evident in their designs. My skate brake system and methods for multiple braking effects offers tremendous improvements and advantages over all of these devices in every way.

The most significant advantage of my skate brake system is the effectiveness of braking due to use of a driving pinion to force the friction surface into the skating surface. This is accomplished as a result of the translation of the skate wheel axle through slots which in turn force a linkage to reverse this motion as it rides upon a strategically positioned ramp. The variable stiffness mechanism allows an intuitive use of a skater's body to control the braking effect, unlike any device on the market today. A great advantage of this device for the manufacturer is the cost effectiveness and simplicity of design, making it easily produced by currently available fabrication methods. A key advantage of my device is that the stopper is held high above the skating surface until it is needed This eliminates inadvertent rubbing of the stopper during cornering or crossing over when skating. A novel advantage of my device is it's ability to brake effectively when going down hill. This unparalleled ability is accomplished by moving the rear wheel upward which allows contact between the stopper and skating surface while the skate is held at an angle to said surface. Thus, the skater achieves control over the components of force in both the direction of skating and the direction of gravitational attraction. An appealing advantage of my device is it's intuitive use. The motion required to actuate the braking mechanism is somewhat similar to executing a common "T-stop" as is done when ice skating. This makes use of my device easy for children and novices to learn and gives skaters confidence in their ability to quickly "stop on demand", something not found on any braking device sold today for in-line skates. In essence, my skate brake system and methods for multiple braking effects offers the safest, least costly, easiest to use and most effective skate brake for in-line skates, roller skates and like devices available anywhere.

REFERENCES CITED

| U.S. Patent Documents | | |
|---|---|---|
| 5,664,794 | 9/09/1997 | Mitchell et al. |
| 5,758,885 | 6/02/1998 | Lowe |
| 5,791,664 | 8/11/1998 | Koester, Jr. |
| 5,865,445 | 2/02/1999 | Svensson et al. |
| 5,887,682 | 3/30/1999 | Zorri, et al. |
| 5,551,712 | 9/03/1996 | Repucci |

| Foreign Patent Documents | | |
|---|---|---|
| 0568878A1 | 11/1993 | European Patent Office |
| 0567948A12 | 11/1993 | European Patent Office |

SUMMARY

Accordingly, the reader will see that my skate brake and methods for achieving multiple braking effects results in a greatly improved, economical, reliable, lightweight and safe device which can be easily used by both novice and experienced skaters. Furthermore, my skate brake and methods for achieving multiple braking effects has additional advantages in that;

it permits highly effective braking action by skaters,
it can be produced easily using simple manufacturing techniques,
it permits effective stopping and control when skating downhill,
it allows the stopper to be held higher above the skating surface,
it can be adapted for use with skateboards and other like devices,
it will allow a low cost effective braking alternative for in-line skaters,
it provides a simple, reliable and sturdy braking mechanism, Although the description above contains many specifications, these should not be construed as limiting the scope of the invention but merely as providing illustrations of some presently preferred embodiments.

PRIOR ART

The applicant is aware of no prior art which is similar in detail to the presently disclosed invention. It will become apparent from review of this patent that the subject matter described here differs greatly from all known prior art which exists for skates, roller skates or like devices.

OBJECTS OF THE INVENTION

It is the object of this invention to provide an improved skate brake and methods for multiple braking effects for in-line skates, roller skates or like devices.

BRIEF DESCRIPTION OF THE DRAWINGS

In the drawings which illustrate the embodiments of my Skate Brake System and Methods for Multiple Braking Effects.

DESCRIPTION OF THE INVENTION

Figure 1:
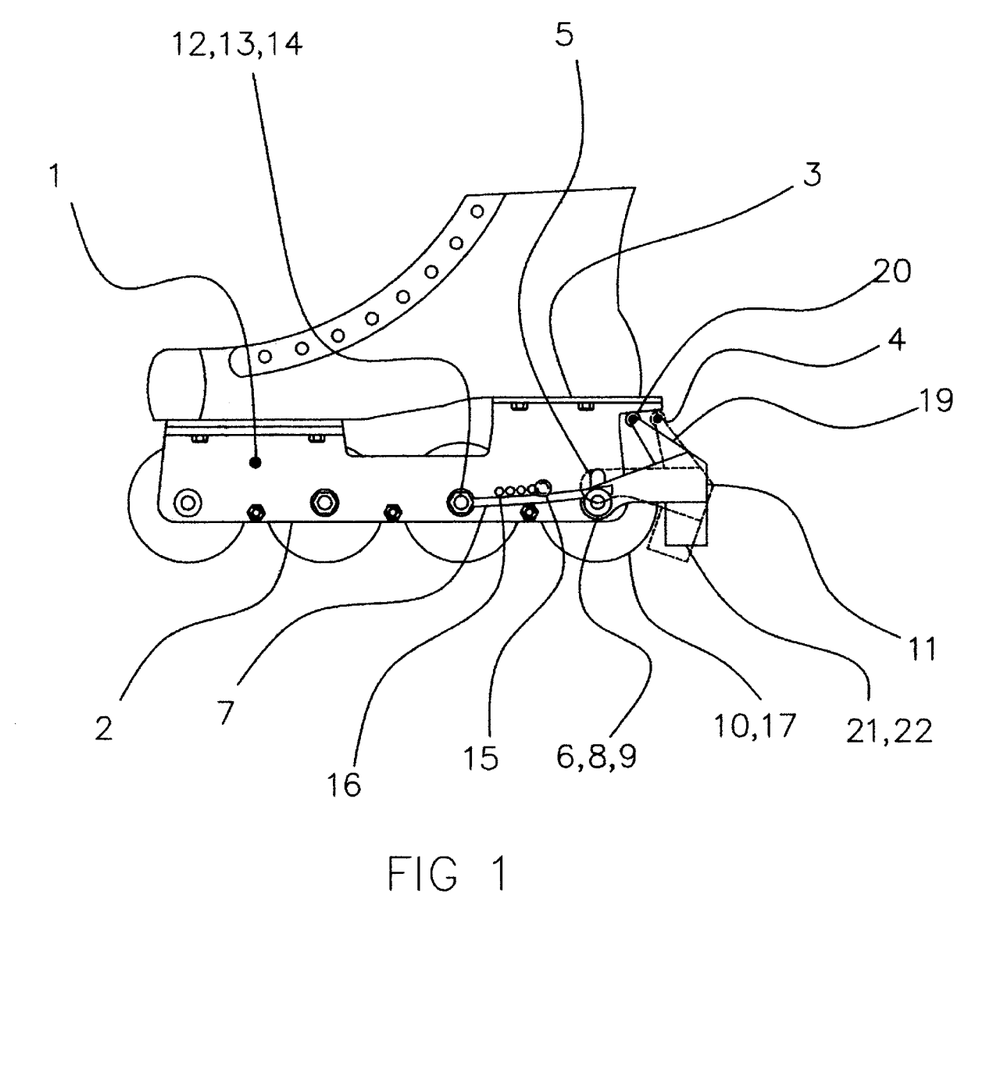
FIG. 1 is a side view of the dual braking mechanism using slots in accordance with the present invention.

The preferred embodiment of the disclosed invention is illustrated in FIG. 1 (side view). A chassis 1 comprises of aligned runners 2 with a common top surface 3 and ramp 4 and is comprised of a material of sufficient strength and durability to support a skater's weight and bear repeated loading without permanent deformation. In the preferred embodiment of FIG. 1 chassis 1 is comprised of a tough plastic moldable material such as ABS (Acrylonitrile-Butadiene-Styrene) or similar moldable plastic or thermoplastic or aluminum or metal. However, chassis 1 can comprise of any material which can support a skater's weight and bear repeated loading without permanent deformation such as polycarbonate, nylon, vinyl, various filled plastic materials, metals, alloys, cast plastic, cast metal, co-polymer, laminates, wood, fibrous or impregnated materials or various other material combinations. Located in chassis 1 and within each runner 2 is a longitudinal slot 5 into which an axle 6 is set and held against one end of slot 5 by way of lever springs 7. In the preferred embodiment of FIG. 1 axle 6 comprises of shaft steel with a hardened surface and circular grooves 8 located generally adjacent to each end into which fit retainer clips 9 which limit the axial motion of axle 6. However axle 6 can comprise of hardened aluminum, brass, bronze or other hardenable material or alloy, crystalline plastic or various other materials with a hardenable surface or composition which provides adequate strength to support a skater's weight and sufficient wear properties for contact with a weight bearing rotational means. In the preferred embodiment of FIG. 1 lever springs 7 comprise of spring steel or music wire or other suitable and commonly used spring material able to withstand repeated loading and unloading without significant loss of spring force. However lever springs 7 can comprise of stainless steel, steel, aluminum, brass bronze, or other metal, plastic or alloy, plastic laminate, rubber, synthetic rubber or elastomer or can be replaced by compression springs or extension springs fixed in such fashion as to provide a spring force upon axle 6 or wheel 10 Additionally, extension or compression springs can be positioned on any part of the linkage formed by axle 6 and linkage 11 to achieve the desired spring force required to hold axle 6 at one end of slots 5. In the preferred embodiment of FIG. 1 lever springs 7 are held in place by clamps 12 which comprise of a slotted shaft 13 and a nut 14. In the preferred embodiment of FIG. 1 clamps 12 are comprised of hardened steel or similar hardenable material such as aluminum, brass or bronze. However clamps 12 can comprise of steel or other metal, plastic, crystalline plastic or other various materials of sufficient strength able to withstand clamping forces. In the preferred embodiment of FIG. 1 pins 15 act as fulcrums points for lever springs 7 and comprise of steel or aluminum. However various plastic materials or metals such as brass or bronze can also be used. In the preferred embodiment are holes 16 provided for locating pins 15 which exist in a plurality of positions at points along runners 2 and serve to shorten or lengthen the effective lever spring 7 length. However odd shaped holes or slots or other apertures which can have any shape can be used to hold pins 15 or sliders located in grooves will be sufficient as well. In the preferred embodiment of FIG. 1 wheel 10 is comprised of synthetic rubber or similar elastomer and is mounted to bearing 17 which is positioned between runners 2 and is rotatably attached to axle 6 and fit of such tolerance as to allow uniform rotational motion of wheel 10 around axle 6. However wheel 10 can comprise of metal, plastic, rubber, synthetic elastomer, wood or other suitable materials for adequate rolling, friction and wear properties. Additionally, wheels 10 can be fixed to axle 6 in such fashion so that axle 6 and wheel 10 rotate together or can be set on pins or screws protruding from each runner 2 or in the case where wheel 10 and axle 6 are fixed together axle 6 can be set. In the preferred embodiment of FIG. 1 linkage 11 is rotatably attached to axle 6 and comprises of moldable plastic or aluminum. However linkage 11 can comprise of steel, plastic or other material with sufficient strength to withstand the forces of combined braking effect, a skater's weight and momentum. In the preferred embodiment of FIG. 1 linkage 11 also comprises of segment 19 located at an adjacent angle to linkage 11 and to which is fixed roller 20 with said segment positioned such that said roller 20 will bear upon ramp 4. In the preferred embodiment linkage I 1 and segment 19 comprise of the same material and are integral to each other. However linkage 11 can comprise of separate segment 19 and can be attached by way of pins, rivets, screws, can be welded or glued together or by other suitable means for attaching load bearing linkages together. Additionally, a slider or other suitable device for bearing upon ramp 4 can be used in place of roller 20. Linkage 11, segment 19 and roller 20 can comprise of steel or other metals, molded plastic, filled plastic or other material able to withstand the forces of braking effect, skater's weight and momentum. However stopper 21 can comprise of various plastic materials filled and non-filled, elastomers, rubber, wood, metal or other material with suitable friction and wear properties for repeated braking. Additionally, stopper 21 can be integral to linkage 11 or segment 19 or located upon an additional arm in the linkage so as to contact the skating surface or another wheel for braking effect during operation. It also can be spring loaded or fixed by a mechanically attached means or magnetic attraction or glued or welded to linkage 11 or segment 19.

Figure 2:
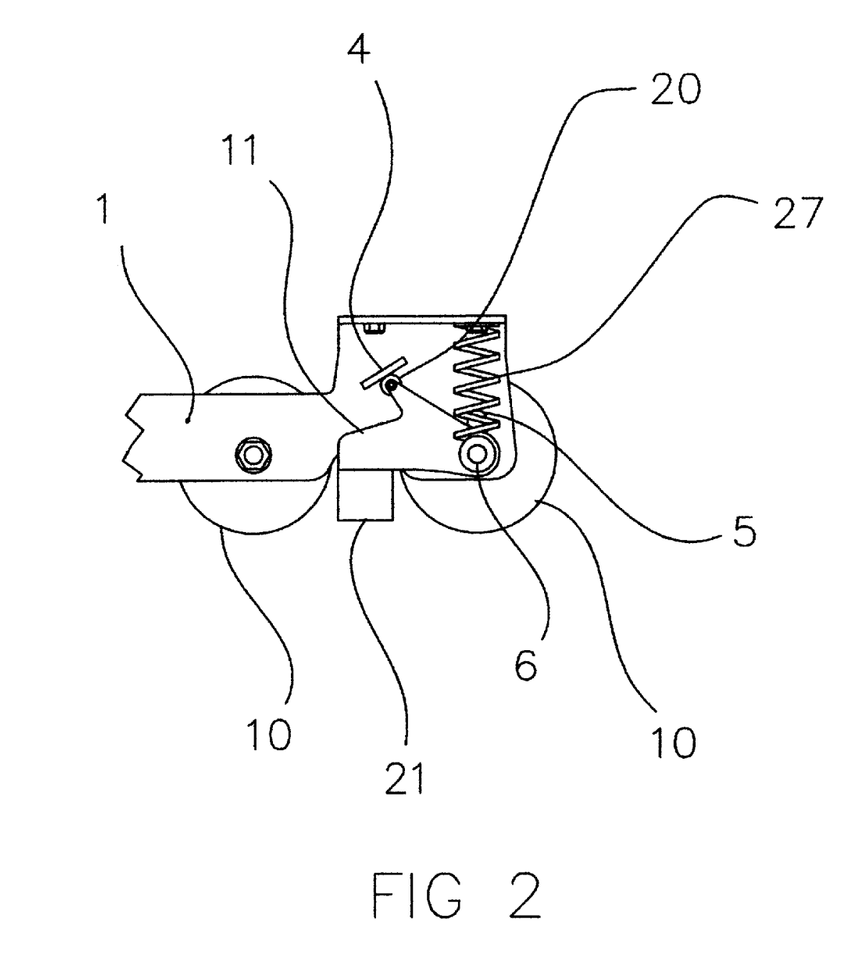
FIG. 2 is a side view of the rearward section of an alternate embodiment using conjoining arms of the dual braking mechanism in accordance with the present invention.
Figure 3:
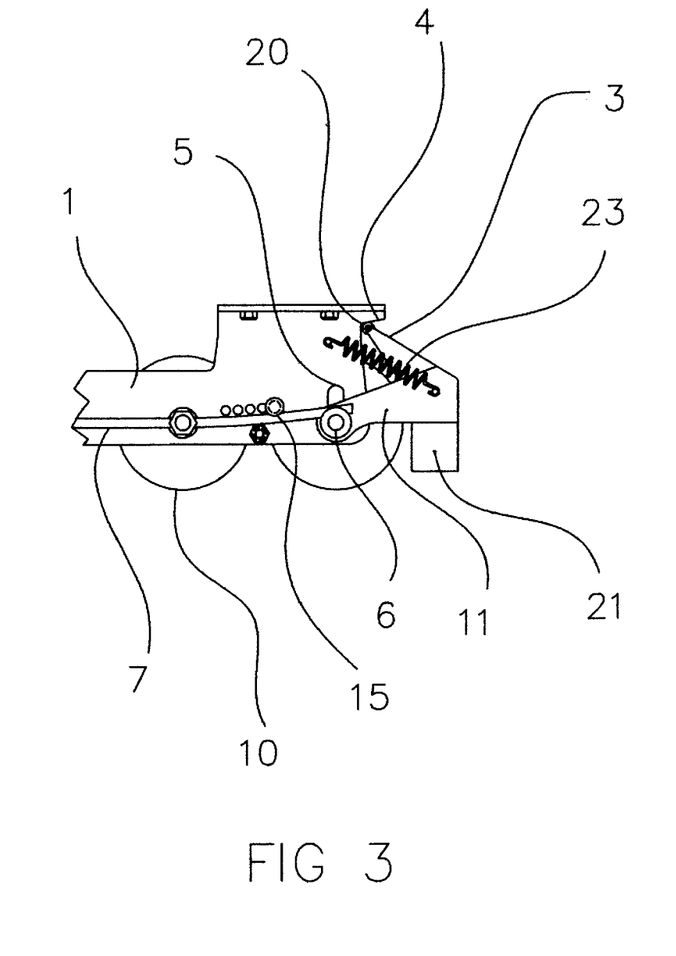
FIG. 3 is a side view of the rearward section of the single braking mechanism using slots in accordance with the present invention.
Figure 4:
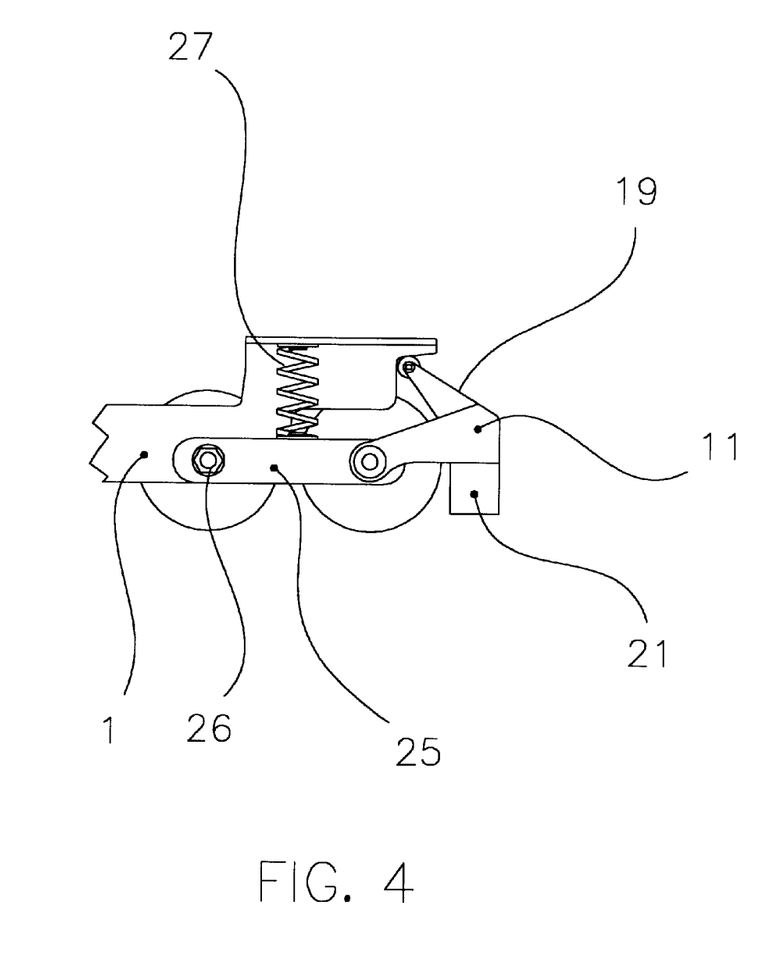
FIG. 4 is a side view of the rearward section of an alternate embodiment using conjoining arms of the single braking mechanism in accordance with the present invention.
Figure 5A:
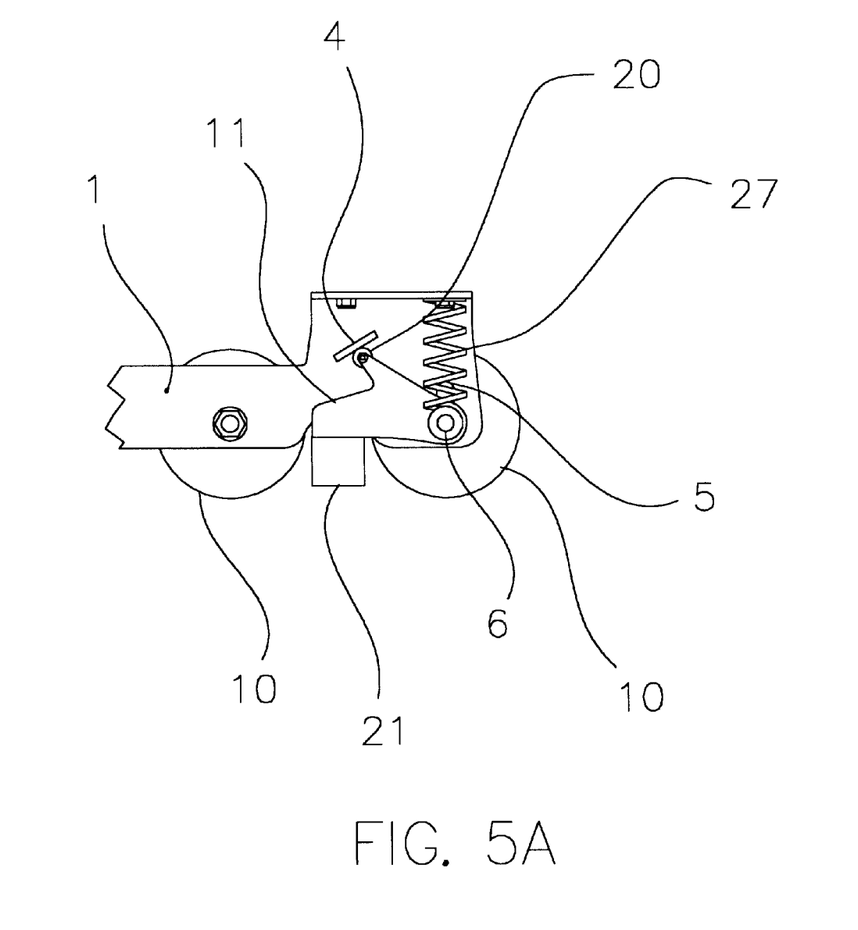
FIG. 5A is a side view of the rearward section of an alternate embodiment using slots with the stopper located between two adjacent wheels of the dual braking mechanism in accordance with the present invention.
Figure 5B:
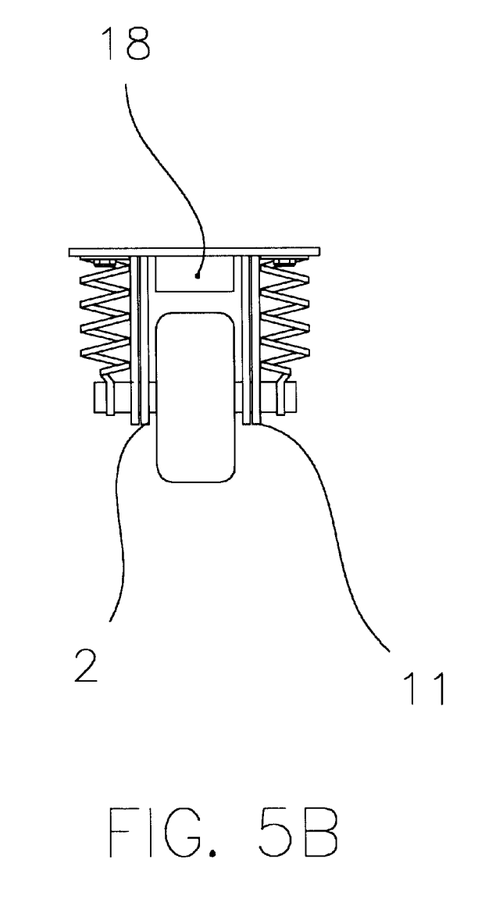
FIG. 5B is a rear view of FIG. 5A.
Figure 6:
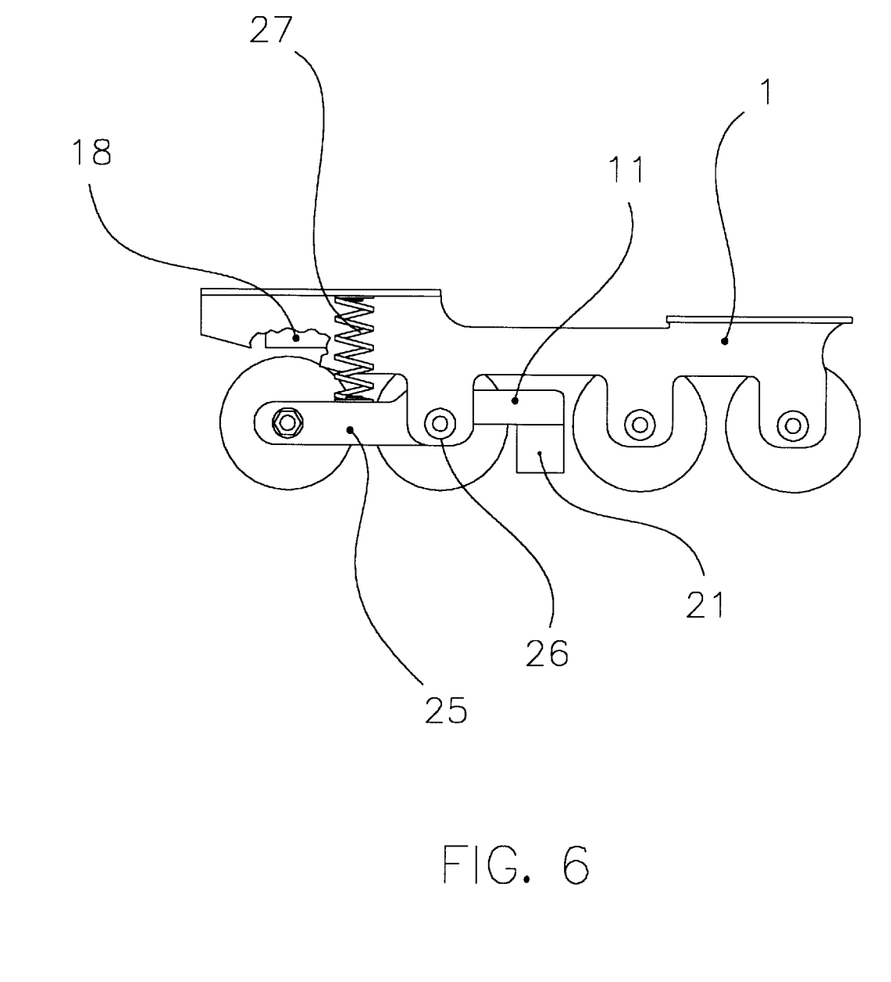
FIG. 6 is a side view of the rearward section of an alternate embodiment using conjoining arms with the stopper located between two adjacent wheels in accordance with the present invention.

In another embodiment of my invention shown in FIG. 2A stopper 21 is located between adjacent wheels and is activated by linkage 11 which has a segment 19 and roller 20 attached and which provide the necessary change in direction of axle 6 and wheel 10 by contact upon ramp 4. The materials which can be used are similar in composition to the materials used for the previously stated embodiments of the present invention.

OPERATION OF INVENTION

The manner of using my Skate Brake System and Methods for Multiple Braking Effect is as follows:

As shown in FIG. 1;

With axle 6 set against slots 5 at a position furthest from brake pad 18 and with wheel 10 in a freely rotating position, the skater applies his or her weight and or momentum to top surface 3 which provides a component of force along slots 5 in the longitudinal direction. When said weight and or momentum has a value greater than the spring forces of lever springs 7 and when an equal and opposite force exists on the outer surface of wheel 10 then axle 6, wheel 10 and the coupling of linkage 19 and axle 6 will move along slots 5 towards brake pad 18, causing the stopper 21 end of linkage 11 to pivot in a direction opposite to the direction of movement of axle 6, wheel 10 and coupling of linkage 19 and axle 6. As wheel 10 contacts brake pad 18, stopper 21 contacts the skating surface and a braking action is caused on wheel 7 by means of contact with brake pad 18 and on stopper 21 by means of contact with the skating surface resulting in a multiple braking effect on chassis 1.

To return components to the original positions the skater must reduce the force component along slots 5 to a value below that of the spring forces of lever springs 7 allowing wheel 7 to cease contact with brake pad 18 and stopper 21 to cease contact with the skating surface. This in turn will cause the components to return to their original positions and wheel 10 to rotate freely and chassis 1 to move freely along skating surface.

I claim:

1. An in-line skate brake assembly comprising:

a plurality of wheels each having an axle, a chassis for supporting said wheels having a pair of runners, each runner having a rear slot for retaining a rear axle of one of said wheels, said chassis also having a ramp surface and an upper friction surface for engaging said rear wheel, a spring means for biasing said rear axle toward the bottom of said slots, a linkage means pivotably mounted to said rear axle comprising a friction pad for engaging a skating surface, and a roller, wherein said roller is in contact with said ramp surface, wherein upward movement of said rear axle within said slots causes said friction surface to contact said rear wheel and simultaneously causes said roller to roll along said ramp pivoting said linkage means about said rear axle allowing said friction pad to engage a skating surface.

2. The skate brake assembly of claim 1 wherein said friction surface means is located between at least two skate wheels and wherein upward movement of said of said rear axle within said slots causes said friction surface to contact said rear wheel and simultaneously causes said roller to roll forward along said ramp pivoting said linkage means about said rear axle allowing said friction pad to engage a skating surface.

3. An in-line skate brake assembly comprising:

a plurality of wheels each having an axle, a chassis for supporting said wheels having a pair of runners, each runner having a rear slot for retaining a rear axle of one of said wheels, said chassis also having a ramp surface and an upper friction surface for engaging said rear wheel, a first spring means for biasing said rear axle toward the bottom of said slots, a linkage means pivotably mounted to said rear axle comprising a friction pad for engaging a skating surface, and a roller, wherein said roller is in contact with said ramp surface, a second spring means for biasing said linkage means such that the friction pad is not in contact with a skating surface, wherein upward movement of said rear axle within said slots causes said friction surface to contact said rear wheel and simultaneously causes said roller to roll backward along said ramp pivoting said linkage means about said rear axle allowing said friction pad to engage a skating surface.

* * * * *